United States Patent
Maxey et al.

(10) Patent No.: US 10,344,195 B2
(45) Date of Patent: Jul. 9, 2019

(54) CONTROLLING FLOW IN DOWNHOLE OPERATIONS

(71) Applicant: Halliburton Energy Services, Inc., Houston, TX (US)

(72) Inventors: Jason Eric Maxey, Spring, TX (US); HsinChen Chung, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 78 days.

(21) Appl. No.: 14/890,777

(22) PCT Filed: Aug. 26, 2013

(86) PCT No.: PCT/US2013/056641
§ 371 (c)(1),
(2) Date: Nov. 12, 2015

(87) PCT Pub. No.: WO2015/030707
PCT Pub. Date: Mar. 5, 2015

(65) Prior Publication Data
US 2016/0160107 A1    Jun. 9, 2016

(51) Int. Cl.
| | |
|---|---|
| *C09K 8/90* | (2006.01) |
| *C09K 8/08* | (2006.01) |
| *C09K 8/68* | (2006.01) |
| *C09K 8/72* | (2006.01) |
| *C09K 8/88* | (2006.01) |
| *E21B 33/138* | (2006.01) |
| *C09K 8/42* | (2006.01) |
| *C09K 8/575* | (2006.01) |

(52) U.S. Cl.
CPC ........... *C09K 8/08* (2013.01); *C09K 8/426* (2013.01); *C09K 8/5758* (2013.01); *C09K 8/68* (2013.01); *C09K 8/725* (2013.01); *C09K 8/887* (2013.01); *C09K 8/90* (2013.01); *E21B 33/138* (2013.01); *C09K 2208/26* (2013.01)

(58) Field of Classification Search
CPC .......... C09K 8/685; C09K 8/24; C09K 8/588; C09K 8/592; C09K 8/512; C09K 8/68; C09K 8/887; C09K 8/12; C09K 8/62; C09K 2208/26; C09K 8/08; C09K 8/426; C09K 8/5756; C09K 8/5758; C09K 8/725; C09K 8/90; E21B 43/25; E21B 43/24; E21B 33/138
See application file for complete search history.

(56) References Cited

U.S. PATENT DOCUMENTS

| | | | | |
|---|---|---|---|---|
| 4,969,526 A | * | 11/1990 | Cawiezel | C09K 8/685 166/300 |
| 5,203,834 A | | 4/1993 | Hutchins et al. | |
| 5,445,223 A | * | 8/1995 | Nelson | C09K 8/685 166/300 |
| 5,762,140 A | * | 6/1998 | Hardy | C09K 8/512 166/295 |
| 2003/0121661 A1 | | 7/2003 | Reddy et al. | |
| 2006/0116296 A1 | * | 6/2006 | Kippie | C09K 8/12 507/244 |
| 2007/0235190 A1 | * | 10/2007 | Lord | C09K 8/685 166/280.2 |
| 2008/0035343 A1 | | 2/2008 | Odeh et al. | |
| 2013/0056213 A1 | | 3/2013 | Medvedev et al. | |
| 2015/0005204 A1 | * | 1/2015 | Alwattari | C04B 28/02 507/211 |

FOREIGN PATENT DOCUMENTS

WO    2011/136678 A1    11/2011

OTHER PUBLICATIONS

International Search Report and Written Opinion dated May 26, 2014 for PCT Application No. PCT/US2013/056641 filed on Aug. 26, 2013.
SPE 35446-PA, Influence of Syneresis on Permeability Reduction by Polymer Gels, Bryant, Steven L, Rabaioli, M.R., Lockhart, Thomas P., Eniricerche SpA SPE Production & Facilities Nov. 1996.
SPE 25220-MS, Divalent Ion-Resistant Polymer Gels for High-Temperature Applications: Syneresis Inhibiting Additives, SPE 1993 International Symposium on Oilfield Chemistry, Albonico, Paola, Lockhart, T.P., Eniricerche SpA.
SPE-24339-PA, Chemistry and Rheology of Borate-Crosslinked Fluids at Temperatures to 300°F, Phillip C. Harris, SPE, Halliburton Services, Journal of Petroleum Technology 1993.

* cited by examiner

*Primary Examiner* — Kumar R Bhushan
(74) *Attorney, Agent, or Firm* — Chamberlain Hrdlicka

(57) ABSTRACT

Systems and methods for controlling flow in downhole operations are described. Systems and methods may include a composition including a fracturing fluid base; one or more ionic compounds; a polymer; a crosslinking agent; and a pH modifier. A breaker may be provided in the composition. The composition may be provided to a formation to control flow, and syneresis may occur.

9 Claims, 1 Drawing Sheet

CONTROLLING FLOW IN DOWNHOLE OPERATIONS

FIELD

The present disclosure relates to systems and methods for controlling flow in downhole operations, and, more specifically, to systems and methods for flow control using syneresis.

BACKGROUND

In oil drilling and stimulation activities, a zone of relatively higher permeability may be drilled through or adjacent or in fluid communication with a formation that is to be stimulated. This higher porosity zone can result in effective loss of fluids. During drilling operations, fluid and proppant may be lost to the zone of higher porosity, decreasing pressure in the stimulation zone. This leak-off may result in inadequate well stimulation.

For at least these reasons, higher porosity zones are typically treated with lost circulation or diverting fluids that prevent further leak-off and allow for continued drilling or stimulation. In the case of diverting fluids, especially, it is also desirable that the diverting fluids break down and easily flow back up the well over some period of time. This reduces the overall damage to the formation and maintains maximum oil production levels.

It is also common to encounter areas where unconsolidated sands or formation water are being produced and need to be eliminated. In these situations, a viscous pill is pumped into a targeted area of the wellbore to serve as a barrier to flow. There can be problems associated with these methods, such as high pumping costs and potential slumping of fluid in the wellbore, which may reopen a pathway for flow.

Typical approaches for either lost circulation or diverting fluids are to provide a high fluid viscosity, inclusion of bridging agents in the fluid, such as carbonates, fibers, etc., or a combination of these. Disadvantages of these approaches include:
- introduction of bridging materials that increase the probability of formation damage;
- increased viscosity that must be overcome by drilling machinery;
- higher pumping pressures from high viscosity, particulate laden pills;
- potential contamination of other zones in the well; and
- required treatment step(s) to later remove the fluids from producing zones.

BRIEF DESCRIPTION OF THE DRAWINGS

The accompanying drawings, which are included to provide a further understanding of the disclosure and are incorporated in and constitute a part of this specification, illustrate preferred embodiments of the disclosure and together with the detailed description serve to explain the principles of the disclosure. In the drawings.

DETAILED DESCRIPTION OF THE PREFERRED EMBODIMENTS

Figure 1:
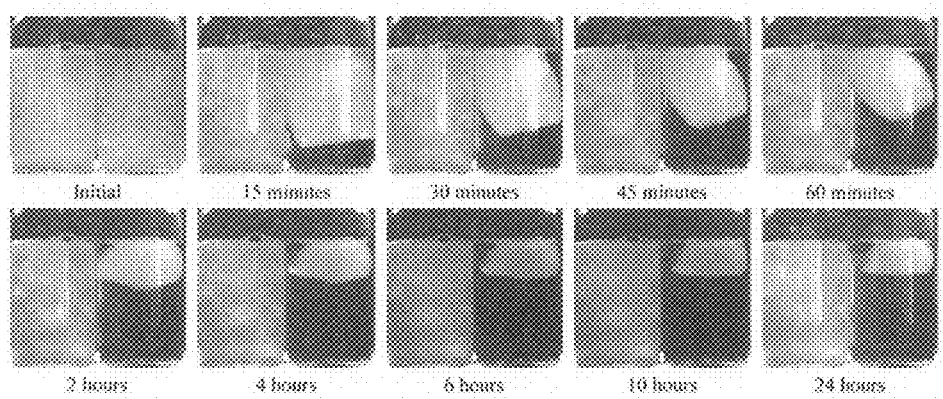
FIG. 1 is a time lapse series of images of an exemplary gel contraction comparison.

Systems and methods are described for flow control during well drilling or stimulation. In certain embodiments, compositions may utilize the contraction of a crosslinked gel, which may be accompanied by the exudation of liquid. This syneresis of the crosslinked gel network to produce a plug that greatly increases in viscosity once in a higher porosity zone can reduce or even prevent further transmission of fluids between a wellbore and a formation. In certain embodiments, the systems and methods described herein may be applied as diverting fluids, sand control fluids, or lost circulation fluids in oilfield drilling applications or for other situations where controlling flow of materials (sand, water, oil, gas, etc.) into or out of the wellbore are advantageous. Certain embodiments may provide a combination of reduced pumping requirements, an ability to easily move into large porous media, a setting process during which fluid viscoelasticity is greatly increased, and mobility in the porous media is decreased, and an ability to break down the system to flow back out of the porous media. The examples described herein relate to fracturing fluids for illustrative purposes only. In particular, the systems and methods may be used wherever increasing viscosity or limiting flow into or out of the wellbore is desirable. For example, embodiments may be used for temporary plugging of a pipeline in absence of valving.

As disclosed in exemplary embodiments herein, a fluid system may use common fracturing fluid components to form an effective barrier to flow in downhole operations. An effective barrier may be any reduction in permeability, such as, but not limited to one more order of magnitude reduction in permeability. The system can be broken-down over time to flow back out of the formation with minimal risk for long-term reduction in porosity of producing formations. The system may be applied in lost circulation zones, as a diverting fluid, in sand or water control operations, or in other situations.

Certain embodiments may provide lower viscosity during pumping and pill placement, which then takes advantage of induced syneresis to produce a high viscosity plug in pores. The system may include a breaker that decomposes the high viscosity plug and allows flowback from the zone to the wellbore with minimal potential for formation damage. The breaker system may be delayed to provide a set time for existence of the plug.

The fluid may be spotted (placed) in a high porosity zone, and may be squeezed into pores. As the gel contracts, the highly viscoelastic plug may effectively form a seal against fluid flow. In the example of unconsolidated sands, the plug may form an effective wall to particle migration.

Excess minerals in water are typically avoided, treated out, or designed around in the creation of a fracturing fluid. Excess minerals and ions can inhibit or prevent polymer hydration or crosslinking or decrease the stability of the crosslinked fluid. In the presence of the same ions under specific conditions, however, the crosslinked gel may contract. Usually, this results in a fluid that resembles applesauce, partitioned portions that are crosslinked surrounded by free liquid. In certain embodiments herein, syneresis occurs uniformly, forming a single plug. The rate and degree of contraction can be controlled through ion concentration, pH, and temperature.

Embodiments may use existing fracturing fluid formulations with selective ion addition at low concentrations. Under certain conditions, for example in formations with high levels of minerals, it may be advantageous to add chelation agents, such as ethylenediamine tetra-acetic acid (EDTA) to inhibit the speed of crosslinking by removing ions. Certain embodiments may work with existing inventories of fracturing fluids and permit the use of additional types of fluids.

Exemplary compositions for controlling flow in downhole operations may include one or more of a fracturing fluid base; one or more ionic compounds; a polymer; a crosslinking agent; and a pH modifier. In certain embodiments, only a polymer and a crosslinking agent may be used. Control of pH and temperature may provide control of speed and degree of syneresis. The composition may produce a plug via syneresis at conditions within a target formation.

The fracturing fluid base may be any acceptable fracturing fluid base for a fracturing fluid such as, but not limited to, water, oil, brine, acids, and combinations thereof. Existing fracturing fluids may be used in embodiments described herein.

One or more ionic compounds may be added to the composition. The one or more ionic compounds may be salts or other derivatives of sulfate, iodide, iron, boron, magnesium, manganese, phosphate, and combinations thereof. In certain embodiments, the one or more ionic compounds may be sulfate containing and iodide containing. Ions and/or combinations of ions may be chosen to provide an approximately uniform syneresis of gel in desired time. Combinations of ions may benefit from synergistic effects of combining various ions at various concentrations. The one or more ionic compounds may have a concentration of approximately 10 ppm to approximately 5,000 ppm. Concentration of an ion or combination of ions and/or total ion concentration can be used to modify syneresis. Total ion concentration may be determinative when at high concentrations.

The polymer may be guar, carboxymethylcellulose (CMC), hydroxymethylcellulose (HMC), xanthan gum, polyacrylamides, scleroglucan, and combinations thereof, and may have a concentration of approximately 1 lb/1,000 gal to approximately 60 lb/1,000 gal.

The crosslinking agent may be borate, aluminum, zirconium, chromium, and combinations thereof, and may have a concentration of approximately 0.1 gal/1,000 gal to approximately 10 gal/1,000 gal.

The pH modifier may be sodium hydroxide, lime, acetic acid, other weak acids, other strong acids, other weak bases, other strong bases, and combinations thereof, and may have a concentration of approximately 0.1 gal/1,000 gal to approximately 10 gal/1,000 gal.

A breaker may be added to breakdown the plug after a delay. The breaker may be persulfate, peroxides, magnesium oxide, peroxydone, permanganate, percarbonate, hypochlorite, and combinations thereof. The breaker may have a concentration of approximately 0.1 lb/1,000 gal to approximately 10 lb/1,000 gal. Under certain conditions, the breaker may be an oxidizing or reducing agent, depending on the crosslinking agent.

The composition may be provided to a downhole formation to control flow in downhole operations. Syneresis may be allowed to occur prior to further downhole operations. A formation may have a higher porosity than adjacent or nearby formations that are in fluid communication with the formation.

The characteristics of the plug may be adjusted by tuning the composition. For example, varying one or more components or concentrations of the composition may be varied to change the time needed for syneresis or the characteristics of the plug, such as strength of the plug. In certain embodiments, for example, increased pH can allow for lower ion concentrations in borate crosslinked systems.

Example 1

In this example a formulation of fluid contained 25-lb/1,000 gal WG-36 (guar gum polymer/gelling agent), 3-gal/1,000 gal BC-140 (boron crosslinking agent), and MO-67 (sodium hydroxide to increase the pH). When this fluid was prepared in fresh water (deionized or tap water), a homogenous and stable crosslinked gel was produced. When sulfate ions in the form of sodium sulfate were added, the gel was destabilized and syneresis was observed. In this case, though, the syneresis was localized, forming the "applesauce" appearance mentioned above. When iodide in the form of potassium iodide was added, however, the syneresis was more rapid, within hours at room temperature, and much more uniform, forming a solid plug rather than the partitioned applesauce appearance.

An example of time-lapse gel contraction is shown in FIG. 1. Two samples including 1500 ppm iodide, 25 lb/1,000 gal WG-36, and 0.5 gal/1,000 gal MO-67 were observed with the comparison of 3 gal/1,000 BC-140 (left) and 6 gal/1,000 BC-140 (right) (pH~9.2-9.3). Images were on a black background so the increased dark area is simply clear fluid. The 6 gal/1,000 gal BC-140 rapidly formed a plug, which was stiff, but brittle. This may be useful in well control situations to provide a barrier to flow in or out of the formation.

Embodiments described herein may be more pronounced at higher concentrations of ions, higher pH, higher temperature, and higher crosslinking concentrations. As such, embodiments may be tuned depending on desired properties of the syneresis, such as time, temperature, pressure, contraction, etc. Variable, such as, but not limited to, polymer selection and crosslinking agent selection may affect strength andor rubberyness of the plug. As temperatures in a downhole environment are typically higher than room temperature, this may provide for more rapid syneresis than the example discussed above.

Figure 2:
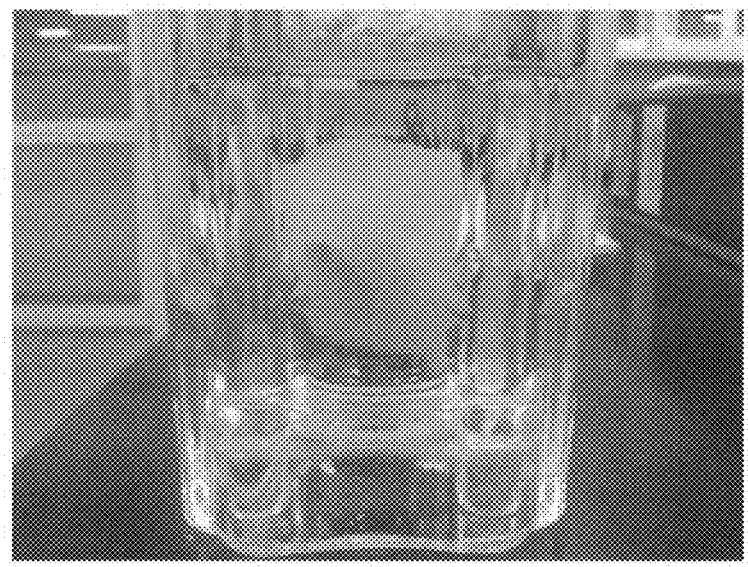
FIG. 2 is an image showing exemplary syneresis to a plug.

In certain embodiments, a breaker system may be employed. The breaker system may decay the polymer/crosslinked gel structure without hampering its formation. FIG. 2 shows a fluid that contained 1500 ppm sulfate, 100 ppm iodide, 25 lb/1,000 gal WG-36, 0.15 lb/1,000 gal sodium persulfate (SP) breaker, 0.5 gal/1,000 gal MO-67, and 3 gal/1,000 gal BC-140 (pH~9.35). The image was taken approximately 20 hours after mixing of the fluid, with the fluid held at room temperature for the duration. The gel contraction to a plug (centered on the blades of the blender) is obvious and was not impeded by the addition of the breaker. The breaker was able to effectively break the system at 150° F., providing an effective means of destroying the plug downhole over time.

The methods and systems described herein may be used in combination with other recovery processes.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Although the foregoing description is directed to the preferred embodiments of the disclosure, it is noted that other variations and modifications will be apparent to those skilled in the art, and may be made without departing from the spirit or scope of the disclosure. Moreover, features described in connection with one embodiment of the disclosure may be used in conjunction with other embodiments, even if not explicitly stated above.

What is claimed is:

1. A method for controlling flow in downhole operations, comprising:
   introducing a composition comprising a fracturing fluid base, a polymer comprising carboxymethylcellulose (CMC), and a crosslinking agent comprising aluminum to a downhole formation;
   adding an iodide to the composition to destabilize the composition and start syneresis; and
   allowing the syneresis of the composition to occur to form a plug in the downhole formation.

2. The method of claim 1, wherein the downhole formation has a higher porosity than a second formation in fluid communication with the downhole formation.

3. The method of claim 1, further comprising varying the concentration of one or more components of the composition to vary the time needed for syneresis to occur and to change characteristics of the plug formed by the syneresis of the composition.

4. The method of claim 1, wherein the iodide has a concentration of approximately 10 ppm to approximately 5,000 ppm.

5. The method of claim 1, wherein the CMC has a concentration of approximately 1 lb/1,000 gal to approximately 60 lb/1,000 gal.

6. The method of claim 1, wherein the aluminum has a concentration of approximately 0.1 gal/1,000 gal to approximately 10 gal/1,000 gal.

7. The method of claim 1, wherein the composition further comprises a pH modifier comprising sodium hydroxide, and the pH modifier has a concentration of approximately 0.1 gal/1,000 gal to approximately 10 gal/1,000 gal.

8. The method of claim 1, wherein the composition further comprises a breaker comprising persulfate, and the breaker has a concentration of approximately 0.1 lb/1,000 gal to approximately 10 lb/1,000 gal.

9. The method of claim 1, wherein the iodide comprises potassium iodide.

* * * * *